(12) United States Patent
Foti

(10) Patent No.: US 8,671,422 B2
(45) Date of Patent: Mar. 11, 2014

(54) SYSTEMS AND METHODS FOR HANDLING ADVERTISEMENTS IN CONJUNCTION WITH NETWORK-BASED BOOKMARKING

(75) Inventor: George Foti, Dollard-des-Ormeaux (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 273 days.

(21) Appl. No.: 12/871,212

(22) Filed: Aug. 30, 2010

(65) Prior Publication Data

US 2011/0078727 A1    Mar. 31, 2011

Related U.S. Application Data

(60) Provisional application No. 61/245,813, filed on Sep. 25, 2009.

(51) Int. Cl.
- H04H 20/14 (2008.01)
- H04H 60/29 (2008.01)
- H04H 60/32 (2008.01)
- H04N 7/10 (2006.01)
- H04N 7/025 (2006.01)
- H04N 7/173 (2011.01)

(52) U.S. Cl.
USPC ............ 725/22; 725/13; 725/32; 725/105

(58) Field of Classification Search
USPC ............................. 725/13, 22, 32, 105
See application file for complete search history.

(56) References Cited

U.S. PATENT DOCUMENTS

| | | | |
|---|---|---|---|
| 5,438,355 A * | 8/1995 | Palmer | 725/110 |
| 5,907,322 A * | 5/1999 | Kelly et al. | 725/51 |
| 2006/0161742 A1 | 7/2006 | Sugimoto et al. | |
| 2007/0277205 A1 * | 11/2007 | Grannan | 725/80 |
| 2008/0250023 A1 | 10/2008 | Baker et al. | |
| 2009/0063649 A1 | 3/2009 | Yamagishi | |
| 2009/0204663 A1 | 8/2009 | Patwari | |

FOREIGN PATENT DOCUMENTS

EP    1926319 A2    5/2008

OTHER PUBLICATIONS

PCT Search Report from corresponding application PCT/IB2010/054321.
OIPF Open IPTV Forum—OIPF-T1-R2—Functional Architecture, V2.0, Sep. 8, 2009, pp. 1-234.
OIPF Open IPTV Forum—OIPF Services and Functions for Release 2, V1.0, Oct. 20, 2008, pp. 1-10.
OIPF Open IPTV Forum—OIPF Service and Platform Requirements V2.0, Dec. 12, 2008, pp. 1-46.

* cited by examiner

Primary Examiner — Dominic D Saltarelli
(74) Attorney, Agent, or Firm — Alex Nicolaescu; Ericsson Canada Inc.

(57) ABSTRACT

Systems and methods according to the exemplary embodiments provide for bookmarking of content in IPTV systems. An IPTV control server can subscribe to receive notifications associated with the insertion of advertisements into other content. Upon receipt of a bookmark storing request, the IPTV control server can determine whether the bookmark storing request is associated with an advertisement or with the other content. A bookmark can then be stored by the IPTV control server including a content identifier based on the determination.

21 Claims, 11 Drawing Sheets

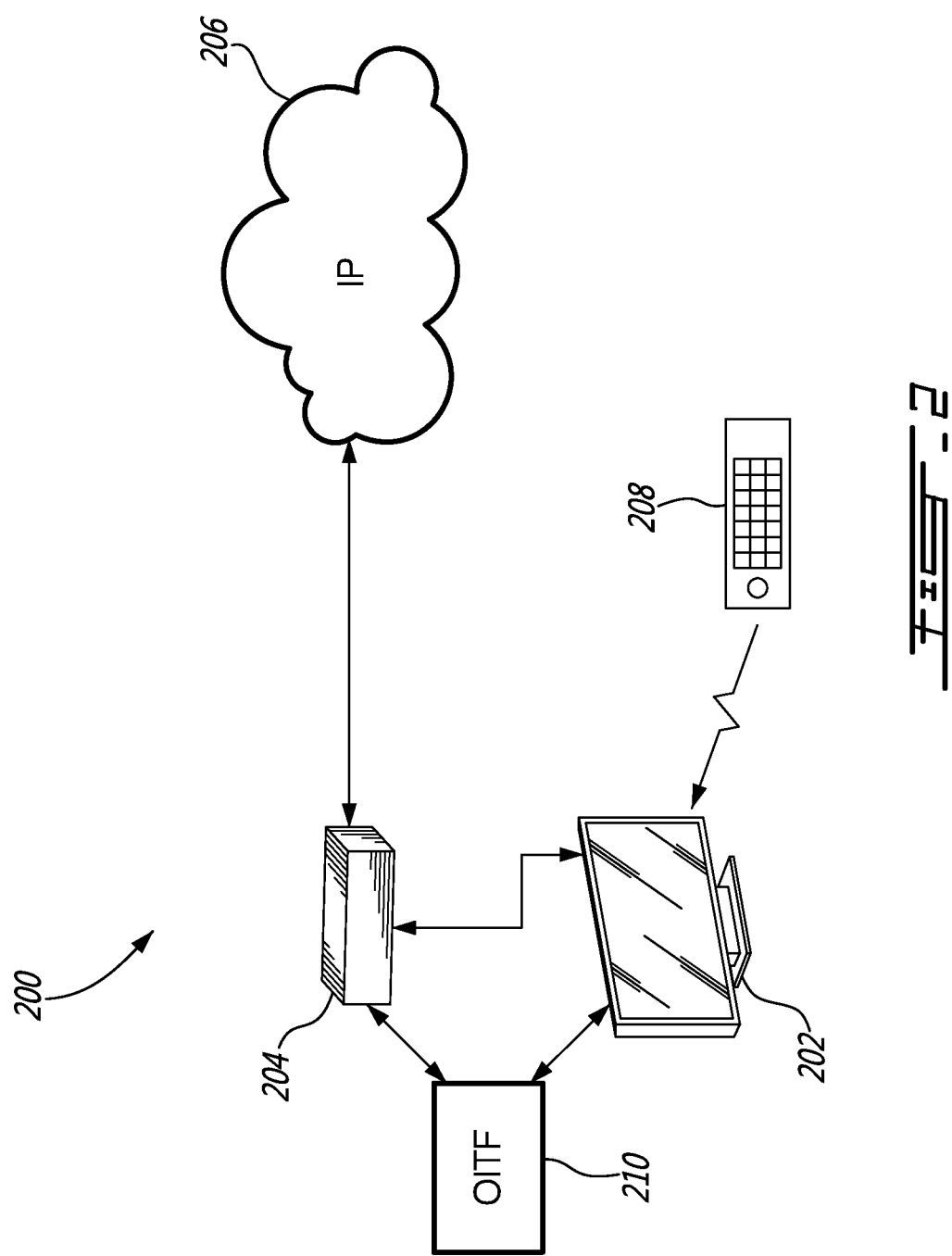

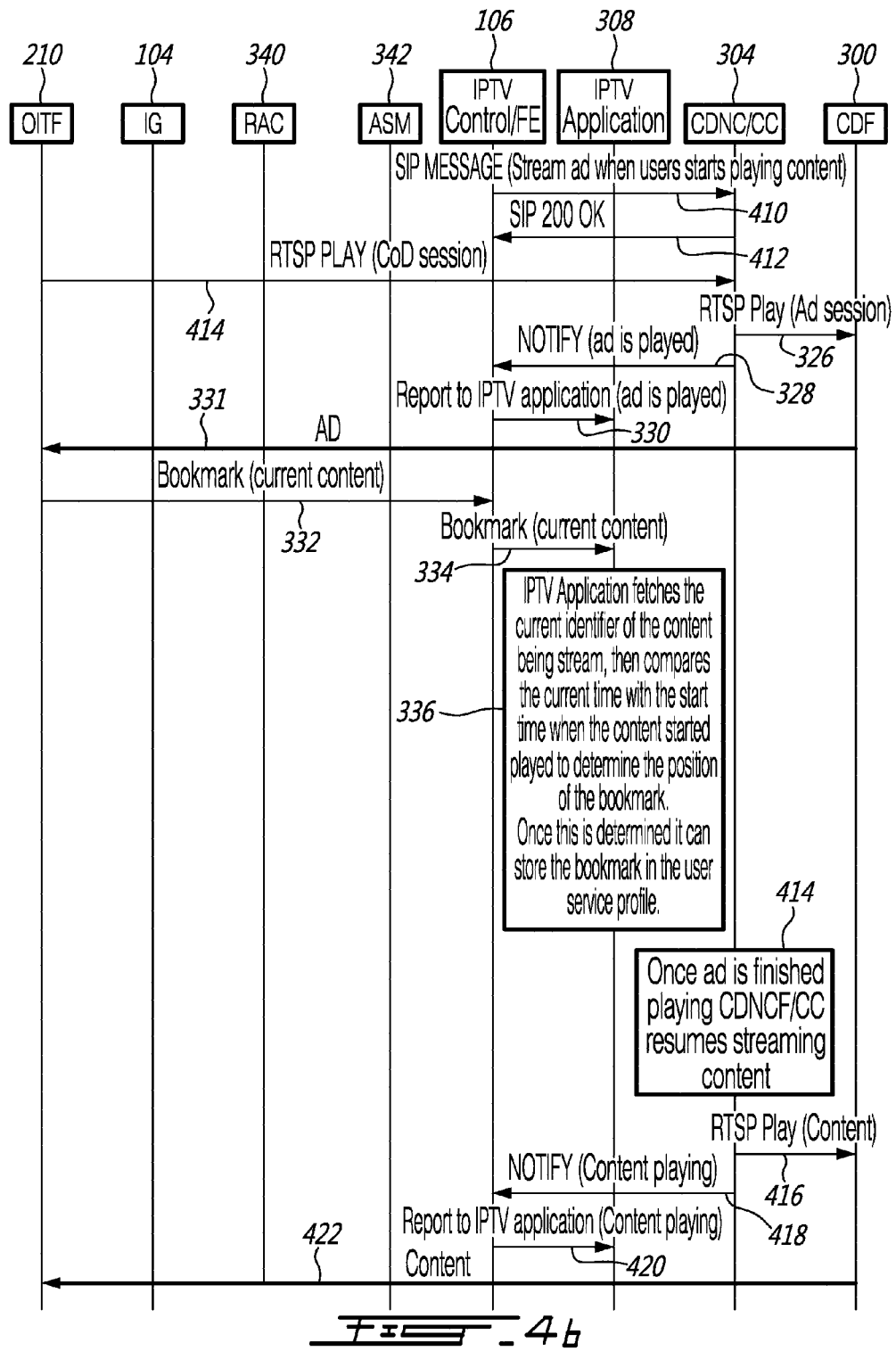

```xml
<?xml version="1.0" encoding="UTF-8"?>
<xs:schema xmlns:xs="http://www.w3.org/2001/XMLSchema" elementFormDefault="qualified"
    attributeFormDefault="unqualified" targetNamespace="urn:oipf:bookmark:2009"
    xmlns:tns="urn:oipf:bookmark:2009" xmlns:tva="urn:tva:metadata:2007"
    xmlns:ig="urn:oipf:config:ig:2008">
    <xs:import namespace="urn:tva:metadata:2007" schemaLocation="imports/tva_metadata_3-1_v141.xsd"/>
    <xs:import namespace="urn:oipf:config:ig:2008" schemaLocation="config-ig.xsd">
        <xs:annotation><xs:documentation>
            Imported to obtain user identifier information
            Note: the type definitions should be moved to an "OIPFtypes" schema so that it can be
            imported by all schemas
        </xs:documentation></xs:annotation>
    </xs:import>
    <xs:element name="BookmarkList">
        <xs:complexType>
            <xs:sequence>
                <xs:element name="Bookmark" type="tns:BookmarkType" minOccurs="0"
                    maxOccurs="unbounded"/>
            </xs:sequence>
        </xs:complexType>
    </xs:element>
    <xs:complexType name="BookmarkType">
        <xs:sequence>
            <xs:element name="Creator" type="ig:IMSPublicIdType"/>
```

FIG. 5

```
            <xs:element name="Created" type="xs:dateTime"/>
            <xs:choice>
                <xs:element name="LinearTVrogramIdentifier" type="XS:string"/>
                <xs:element name="CoD ProgramIdentifier" type="XS:string"/>
                <xs:element name="AdIdentifier" type="xs:string"/>
            </xs:choice>
            <xs:element name="NetworkReplayLocation" type="xs:string" minOccurs="0" maxOccurs="1"/>
            <xs:element name="Position" type="xs:duration"/>
            <xs:element name="Tag" type="xs:string" minOccurs="0"/>
            <xs:element name="Rank" type="xs:string" minOccurs="0"/>
            <xs:element name="Comment" type="xs:string" minOccurs="0"/>
            <xs:element name="Expires" type="xs:dateTime" minOccurs="0"/>
            <xs:element name="Sharing" type="xs:boolean"/>
            <xs:element name="UseCount" type="xs:nonNegativeInteger" minOccurs="0"/>
            <xs:element name="UseTime" type="xs:dateTime" minOccurs="0" maxOccurs="unbounded"/>
        </xs:sequence>
        <xs:attribute name="id" type="xs:string" use="required"/>
    </xs:complexType>
</xs:schema>
```

FIG - 5 CONTINUED

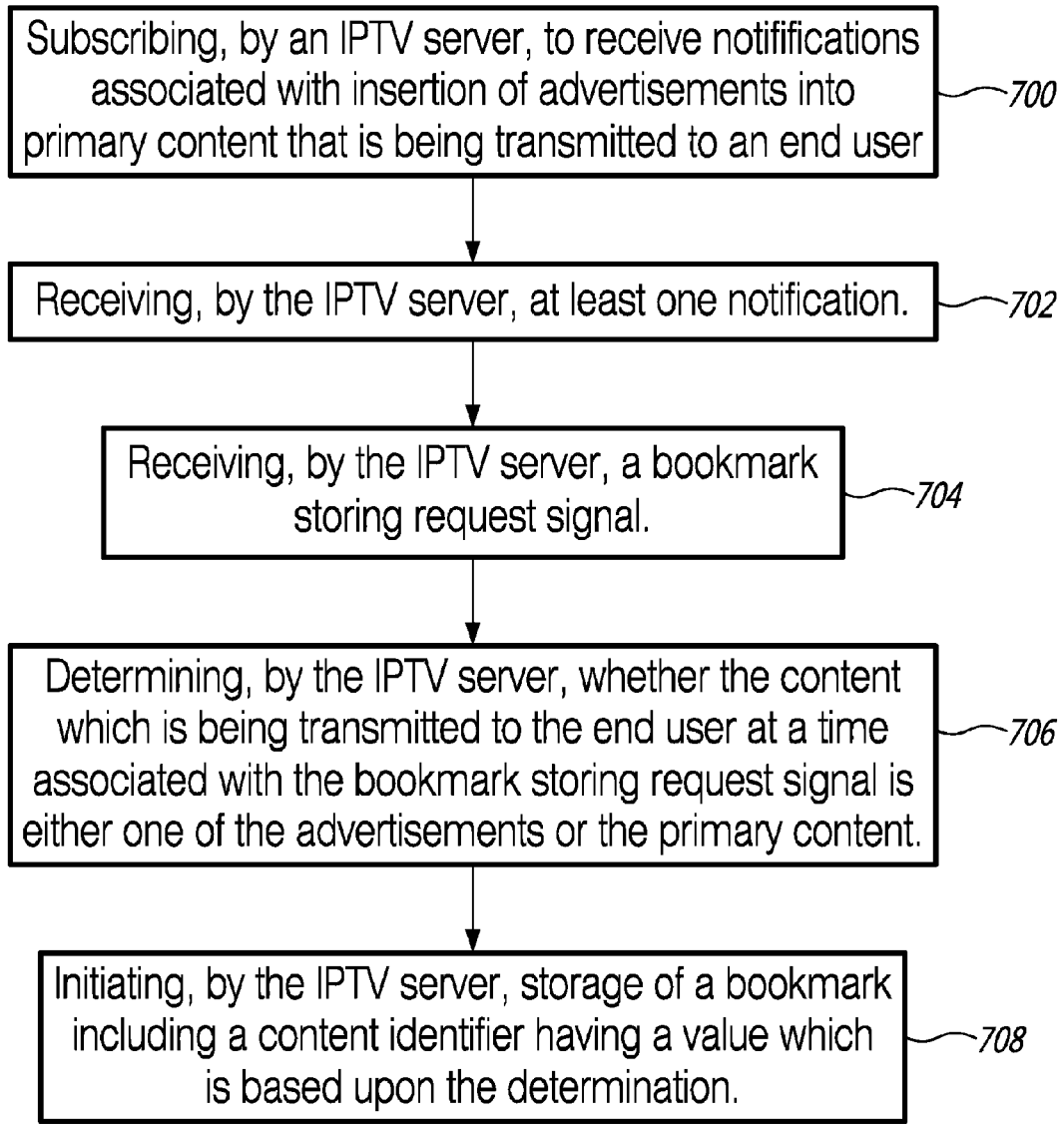

SYSTEMS AND METHODS FOR HANDLING ADVERTISEMENTS IN CONJUNCTION WITH NETWORK-BASED BOOKMARKING

RELATED APPLICATION

The present application is related to, and claims priority from, U.S. Provisional Patent Application No. 61/245,813, filed Sep. 25, 2009, entitled "Determining Contents and Their Identifiers for Bookmarking Purposes in Content-On-Demand Delivery", to George Foti, the disclosure of which is incorporated herein by reference.

TECHNICAL FIELD

The present invention relates generally to communications systems and in particular to methods and systems for bookmarking in IPTV systems.

BACKGROUND

As technology advances, the options for communications have become more varied. For example, in the last 30 years in the telecommunications industry, personal communications have evolved from a home having a single rotary dial telephone, to a home having multiple telephone, cable and/or fiber optic lines that accommodate both voice and data. Additionally cellular phones and Wi-Fi have added a mobile element to communications. Similarly, in the entertainment industry, 30 years ago there was only one format for television and this format was transmitted over the air and received via antennas located at a home. This has evolved into both different standards of picture quality such as, standard definition TV (SDTV), enhanced definition TV (EDTV) and high definition TV (HDTV), and more systems for delivery of these different television display formats such as cable and satellite. Additionally, services have grown to become overlapping between these two industries. As these systems continue to evolve in both industries, the service offerings will continue to merge and new services can be expected to be available for a consumer. Also these services will be based on the technical capability to process and output more information, for example as seen in the improvements in the picture quality of programs viewed on televisions, and therefore it is expected that service delivery requirements will continue to rely on more bandwidth being available throughout the network including the "last mile" to the end user.

Another related technology that impacts both the communications and entertainment industries is the Internet. The physical structure of the Internet, and associated communication streams, has also evolved to handle an increased flow of data. Servers have more memory than ever before, communications links exist that have a higher bandwidth than in the past, processors are faster and more capable and protocols exist to take advantage of these elements. As consumers' usage of the Internet grows, service companies have turned to the Internet (and other IP networks) as a mechanism for providing traditional services. These multimedia services can include Internet Protocol television (IPTV, referring to systems or services that deliver television programs over a network using IP data packets), video on demand (VOD), voice-over-IP (VoIP), and other web related services.

To accommodate the new and different ways in which IP networks are being used to provide various services, new network architectures are being developed and standardized. One such development is the Internet Protocol Multimedia Subsytem (IMS). IMS is an architectural framework which uses a plurality of Internet Protocols (IP) for delivering IP multimedia services to an end user. A goal of IMS is to assist in the delivery of these services to an end user by having a horizontal control layer which separates the service layer and the access layer.

In IPTV systems, bookmarking is an important application that allows users to mark a point in a specific content which is being delivered to their output device (e.g., web TV, user equipment (UE), or the like), for example a streamed TV program, for later viewing starting from that bookmarked point. bookmarking is closely tied to the content being viewed, since the identity of the content being viewed is an important element that needs to be captured by the network in order to properly save the bookmark state for later retrieval.

SUMMARY

Exemplary embodiments describe network-based bookmarking mechanisms which can, for example, acquire information which inform such mechanisms whether the content to be bookmarked is either a particular content-on-demand (CoD) program, e.g., a movie, or is instead an advertisement which has been inserted by the network into the CoD program. In this way, a bookmark requested by a user will be subsequently usable by the network to accurately retrieve the specific content which the user intended to save for later viewing.

According to one exemplary embodiment, a method for network-based bookmarking of content which is currently being output at an end user device includes the steps of subscribing, by an IPTV server, to receive notifications associated with insertion of advertisements into a primary content that is being transmitted to an end user, receiving, by the IPTV server, at least one of said notifications, receiving, by the IPTV server, a bookmark storing request signal, determining, by the IPTV server using information in said at least one of said notifications, whether the content which is being transmitted to the end user at a time associated with the bookmark storing request signal is either one of the advertisements or the primary content, and initiating, by the IPTV server, storage of a bookmark including a content identifier having a value which is based upon the determination.

According to another exemplary embodiment, a communication system includes an IPTV control server having a processor configured to subscribe to receive notifications associated with insertion of advertisements into a primary content that is being transmitted to an end user and further configured to receive at least one of the notifications and a bookmark storing request signal, wherein, in response to receiving the bookmark storing request signal, the processor is configured to determine, using information in said at least one of said notifications, whether content which is being transmitted to the end user at a time associated with the bookmark storing request signal is either one of the advertisements or the primary content, and further wherein the processor is configured to initiate storage of a bookmark including a content identifier having a value which is based upon the determination.

According to yet another exemplary embodiment, a computer-readable medium containing instructions which, when executed on a processor or computer, perform the steps of subscribing to receive notifications associated with insertion of advertisements into a primary content that is being transmitted to an end user, receiving at least one of the notifications, receiving a bookmark storing request signal, determining, using information in said at least one of said notifications, whether the content which is being transmitted to the end user at a time associated with the bookmark storing request signal is either one of the advertisements or the primary content, and initiating storage of a bookmark including a content identifier having a value which is based upon the determining.

BRIEF DESCRIPTION OF THE DRAWINGS

The accompanying drawings illustrate exemplary embodiments, wherein:

FIG. 2 illustrates an exemplary IPTV portion of the communication system of FIG. 1 in more detail;

FIGS. 4(a) and 4(b) are a signaling diagram illustrating systems and methods for advertisement handling and network-based bookmarking according to another exemplary embodiment;

FIG. 5 is an XML schema associated with bookmarks according to an exemplary embodiment;

FIG. 7 is flow chart illustrating a method for network-based bookmarking according to an exemplary embodiment.

ACRONYM LIST

ASM Authentication Session Management
CC Cluster Controller
CDNC Content Delivery and Network Control
CDF Content Delivery Function
CoD Content on Demand
FE Functional Entity
IG IMS Gateway
IMS IP Multimedia Subsystem
IP Internet Protocol
IPTV IP Television
OIPF Open IPTV Forum
OITF Open IPTV Terminal Function
RAC Resource Admission Control
RTSP Real Time Streaming Protocol
URL Uniform Resource Locator
XML eXtensible Markup Language

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
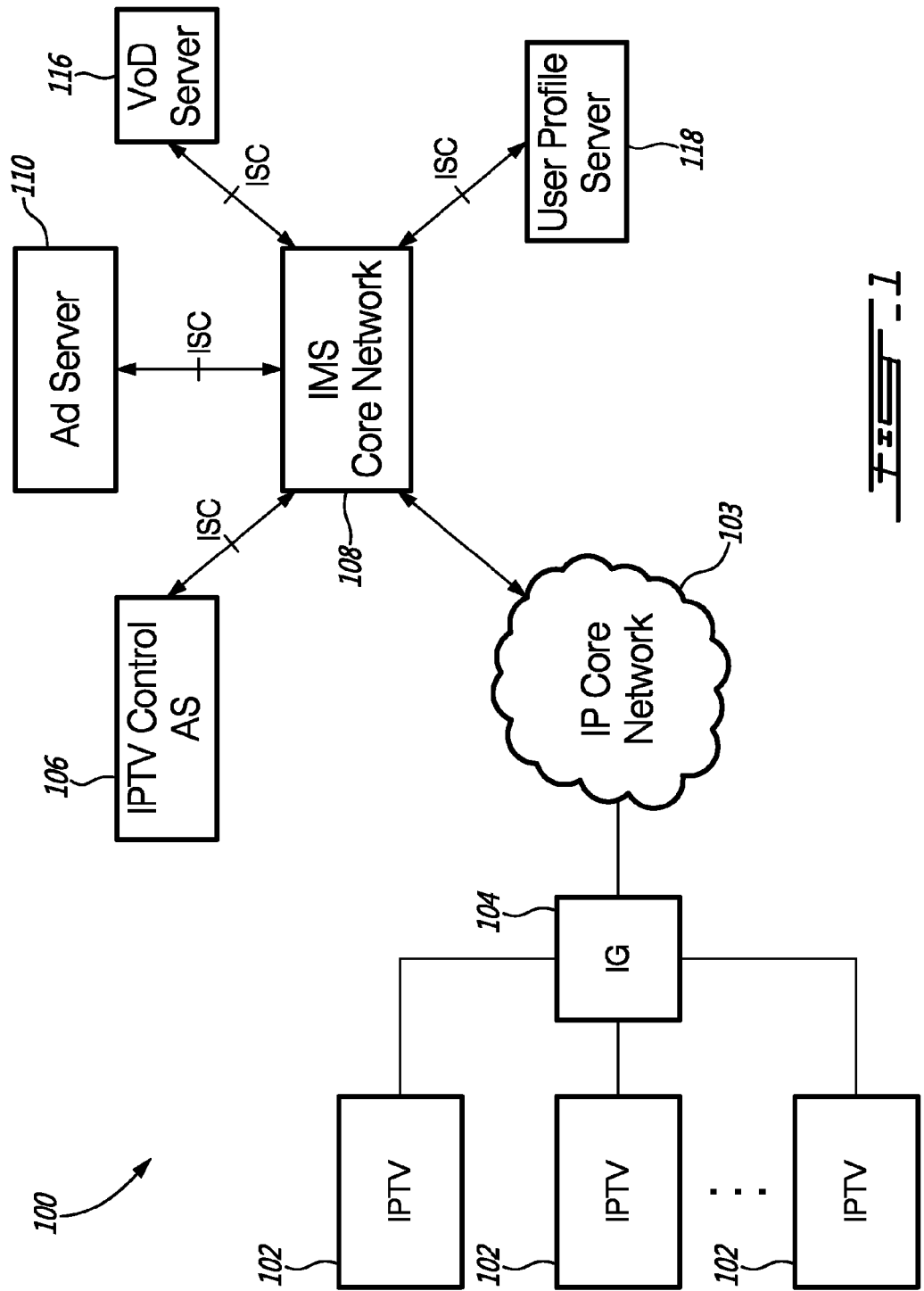
FIG. 1 illustrates a communication system according to an exemplary embodiment.

In order to provide some context for this discussion, FIG. 1 illustrates an exemplary communications network 100 in which these exemplary embodiments can be implemented. Therein, a number of IPTV end user equipments 102, e.g., televisions and/or set-top boxes, are connected to an IP core network 103 via an IMS gateway (IG) and access router 104. IPTV communications between the end user equipments 102 and the IPTV control application server 106 are provided via the IP core network 103, e.g., potentially including the Internet, and an IMS core network 108. An ad server 110, a video-on-demand (VoD) server 116 and a user profile server 118 are also connected to the IMS core network 108, e.g., via the IMS Service Control (ISC) interface. The ad server 110 and VoD server 116 both provide content which can be streamed toward a subscriber (user). The ad server 110 and VoD server 116 are sometimes referred to herein as content delivery functions (CDFs), and the ad server 110 and VoD server 116 may, or may not, be co-located with one another.

IPTV is a service which provides digital television signals delivered using IP over a network architecture (such as IMS) and may be combined with telephone services (such as VoIP), web access and VoD. An exemplary user side of an IPTV system from which network-based bookmarking may be initiated according to these exemplary embodiments will now be described as shown in FIG. 2. Therein, the IPTV system 200 includes an IPTV (web TV) 202, a set-top box 204 and a connection to the IP network 206. The IPTV 202 is capable of displaying a variety of video signals, associated with different content types described below, and can also be used for voice communications. In particular IPTV 202 is capable of receiving signals using IP protocols either directly or via set-top box 204. Set-top box 204 typically acts to control inputs to IPTV 202, can contain a removable smart card (not shown) such as an IP multimedia services identity module (ISIM) application on a universally integrated circuit card (UICC) and is in communications with both IPTV 202 and IP network 206 (potentially through an IG 104, if not integrated therewith). The UICC contains memory within which security information and applications can be stored.

In the system of FIG. 2, a remote control device 208 may, for example, communicate wirelessly (e.g., via IR or RF) to provide inputs to the IPTV 202 and/or set-top box 204, including a command from the user to bookmark a current delivered content which is being output on the IPTV 202 at a particular point in time. An Open ITV Terminal Function (OITF) 210 runs on either (or is distributed between) IPTV 202 and set-top box 204. The OITF 210, among other things, processes a bookmarking command received from a user watching content on his or her end user device 102, 202 as will be described in more detail below. For the interested reader, many more details regarding IPTV systems in general are described in the standard specification OIPF-T1-R2-Functional Architecture V 2.0, Sep. 8, 2009, promulgated by the Open IPTV Forum, the disclosure of which is incorporated here by reference. A discussion of bookmarking in that document is found on pages 119-127.

Advertisements may be inserted into the delivered content either locally, e.g., under the control of OITF 210 in response to a local event such as pausing of the delivered content, or remotely by the network, e.g., on a periodic basis, or in response to certain events such as the user pausing a content. Connecting the ad server 110 to the IP core network 103 via an IMS core network 108 enables systems and methods according to these exemplary embodiments to insert advertisements from the network side, and provides ad services with reachability features available in IMS systems to, for example, (a) determine when a particular user or users are online and (b) identify a particular piece of IPTV equipment which that user is currently viewing to determine when and where to send personalized advertisements through the network to those targeted end user(s).

Using the above-described exemplary IPTV and IMS architectures shown in FIGS. 1 and 2, an end user can obtain a number of different types of content via his or her IPTV 202 including, for example, scheduled content (also sometimes referred to as "linear television"), unscheduled or content-on-demand (CoD), and user generated content, among other types of content. An example of scheduled content is a television program which is broadcast at a particular time to a plurality of users (or other scheduled, multicast content). An example of CoD content is a movie (or other unscheduled, unicast content) ordered by an end user from a service operating the VoD server 116 which is transmitted through the system illustrated in FIGS. 1 and 2 to an end user device 102, 202.

When a user is watching and/or listening to any of these types of content (or some other type of content) on his or her end user device 102, 202, she or he may want to stop watching and/or listening to that content and have the network "save" her or his place in that program so that she or he may continue the content at a later time or date from the stopping point. A bookmark provides a mechanism to identify a specific point in time during the play out of a content item so that, when stored in the network and later retrieved, the content can be restarted at the desired point in time In addition to scheduled content and content on demand, another type of content that may be relevant for bookmarking according to exemplary embodiments is advertising. In particular, it would be desirable to handle the case where a user requests that a program be bookmarked while watching an advertisement. If the advertising is provided as an integral part of the content being sent from the network to an end user device 102, 202, then bookmarking at that point poses no special problems since the advertisement is to all intents and purposes a part of the primary content which can be retrieved from the same source as the primary content at its particular time position within that content. In the context of this specification the phrase "primary content" refers to any content other than advertising.

However if the content is provided to the end user as one session, and the advertising is provided to the end user as a second session distinct from the first, then some care should be taken according to exemplary embodiments so that the network is able to bookmark the desired one of either the content or the advertisement. Two distinct cases may be considered: network-inserted advertisements and local (OITF)-inserted advertisements.

Figure 3A:
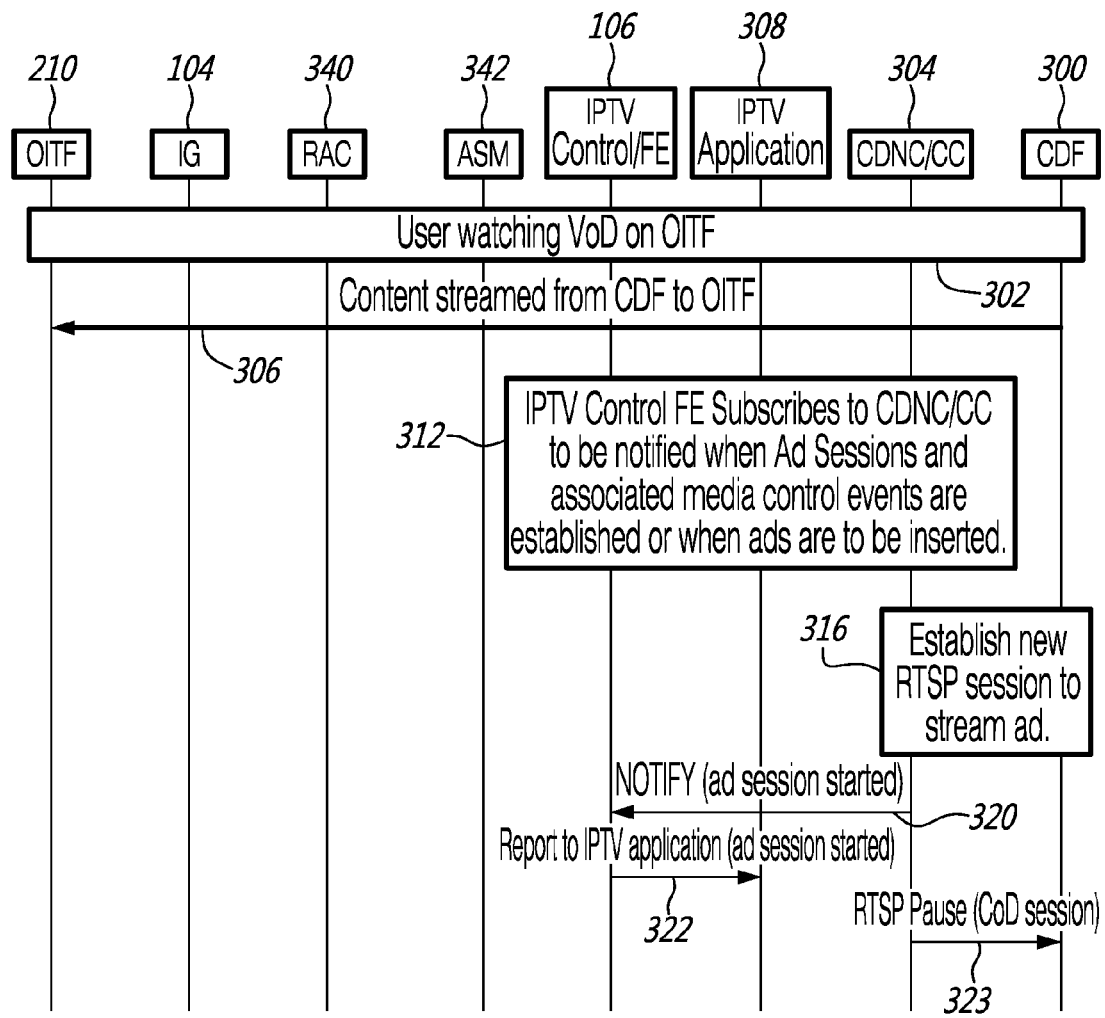
FIG. 3(a) is a signaling diagram illustrating systems and methods for advertisement handling and network-based bookmarking according to an exemplary embodiment.
Figure 3A:
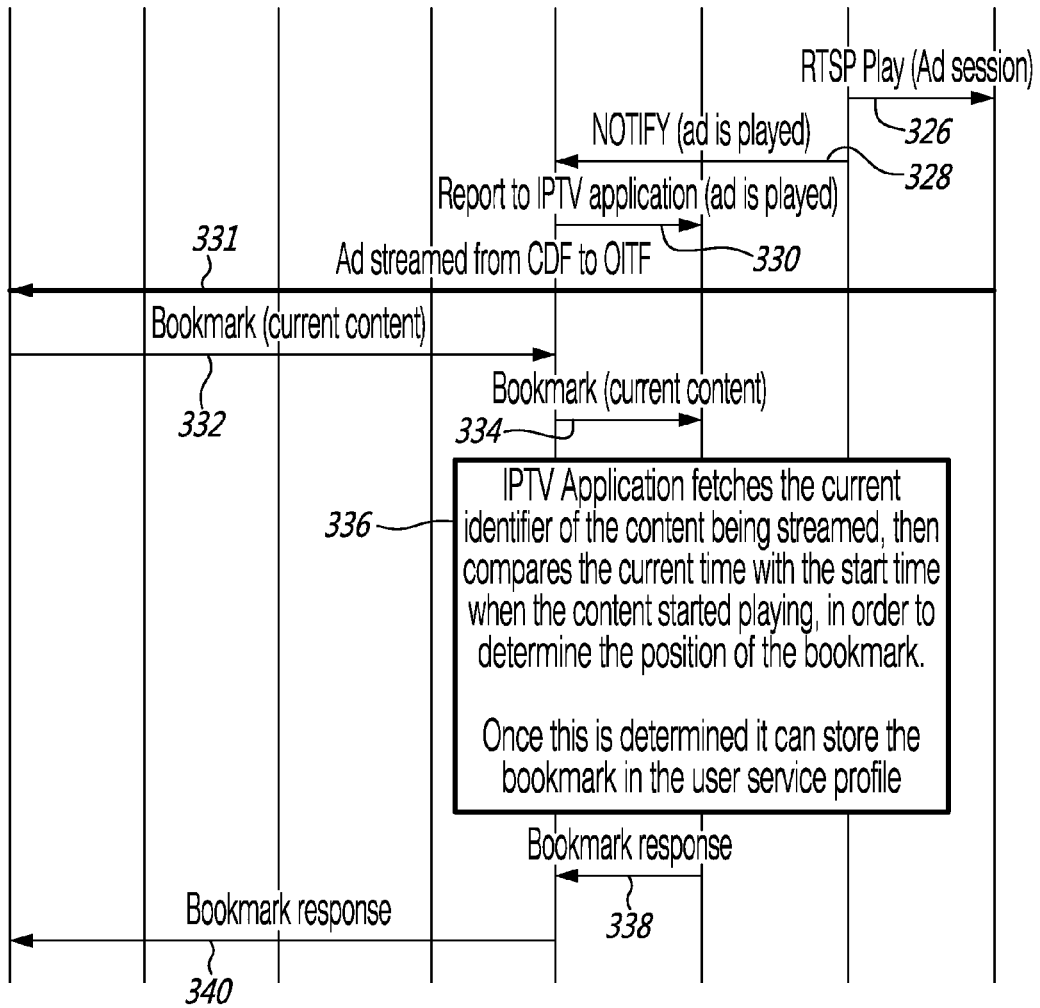
Figure 3B:
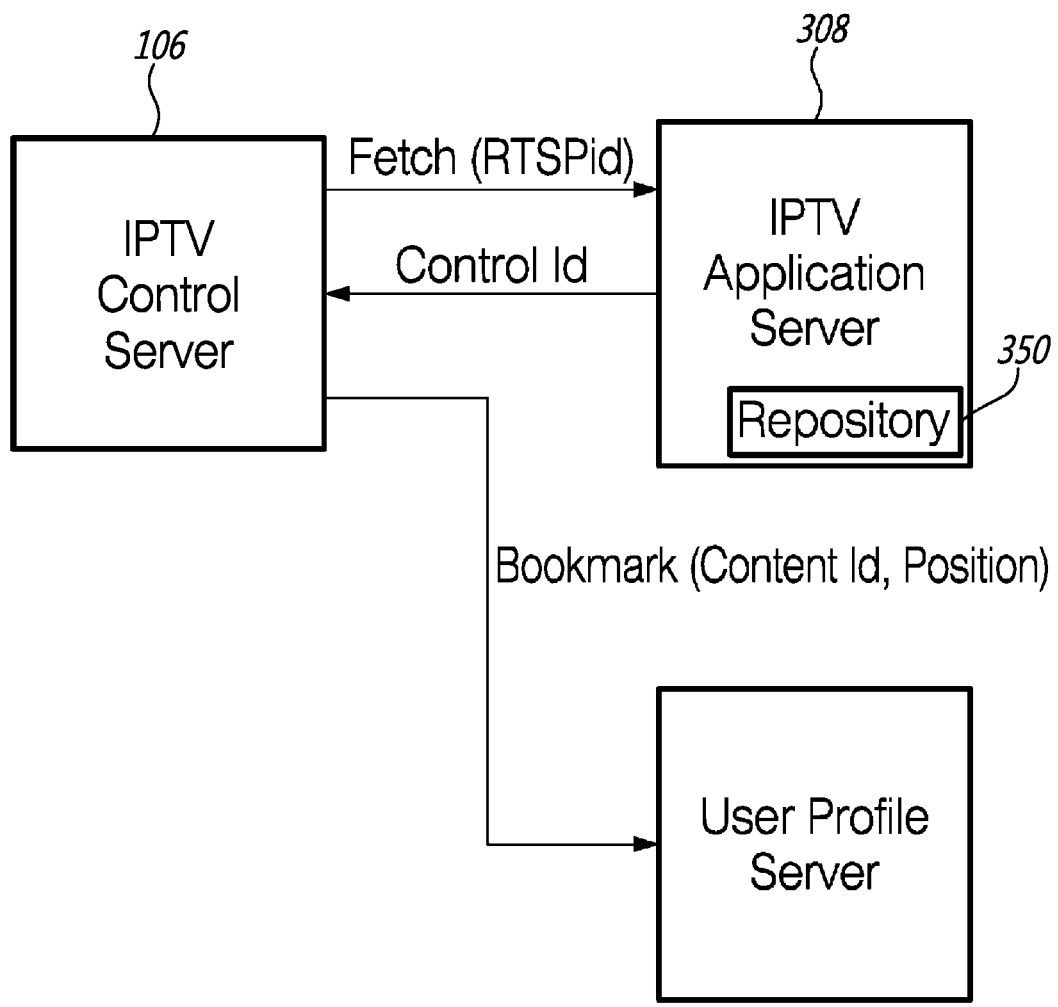
FIG. 3(b) illustrates a portion of FIG. 3(a) in more detail.

In conjunction with network-inserted advertisements, two sub-cases can be considered: advertisements which are inserted by the network in response to a network-based trigger, e.g., elapsed time of the primary content, and advertisements which are inserted by the network in response to a user-based trigger, e.g., when the user pauses the primary content. Considering first a network-based triggering of a network-inserted advertisement, an example of how exemplary embodiments handle bookmarking in these circumstances is illustrated in FIG. 3(*a*). Therein, consider that an end user is currently watching a video on demand program being transmitted to his or her OITF 210 and then output via end user device 102, 202 from a content delivery function (CDF) 300 as indicated by block 302 via a first RTSP session. When this content delivery session is set-up toward the OITF 210, certain information is maintained by the network for that COD session in a network repository. For example, the information stored in the repository can include (for an exemplary IMS-based communication system) three linked identification elements, e.g.:
User id <.-> SIP session CoD Session id<-> RTSP id session for streaming the CoD Generally speaking, to implement network-triggered advertising, the network (or more specifically the Content Delivery and Network Control/Cluster Controller (CDNC/CC) 304) inserts an advertisement by initiating a second RTSP session to a content delivery network where the advertisement is located, pausing the content stream 306 that the end user is currently watching via the first RTSP session and then starting playing the advertisement, until completion, before resuming the original stream. Thus, according to one exemplary embodiment, each network-inserted advertisement will have a corresponding RTSP session.

When the network establishes each separate RTSP session for each ad to be delivered to a particular user, the repository will be updated to include the information associated with those new sessions. For example, if four advertisements were to be inserted into a content stream, then four separate RTSP sessions can be indicated in the network repository as:
User id <.-> SIP session CoD Session id<-> RTSP id session for streaming the CoD
User id <.-> SIP session CoD Session id<-> RTSP1 id for ad1
User id <.-> SIP session CoD Session id<-> RTSP2 id for ad2
User id <.-> SIP session CoD Session id<-> RTSP3 id for ad3
User id <.-> SIP session CoD Session id<-> RTSP4 id for ad4

It will be appreciated by those skilled in the art that the aforedescribed data is purely exemplary and that, for example, more data can be stored for each session as desired. Moreover, the aforedescribed data reflects an implementation involving an IMS-based network, but for networks using other protocols, e.g., HTTP or RTSP, this binding data could be stored in the network repository as:
User id <.-> HTTP Session CoD Session, or
User-id<-> RTSP Session CoD Session The network repository which stores this session information can, for example, be located in the IPTV control server 106 (for IMS-based systems) or the IPTV application 308 (for IMS-based systems and non-IMS based systems). If the network repository is located in the IPTV application 308, which may be desirable in order for the approach to be generic to IMS and non-IMS based implementations, then the IPTV control server 106 needs to have additional functionality since the IPTV control server 106 will need to transfer all this information to the IPTV application 308, including information about the initial COD session setup.

Thus, the IPTV control server 106 has access to information about the various sessions which are associated with a particular user/OITF 210. To properly handle bookmarking in the presence of these network-inserted advertisements, the IPTV control server 106 needs to know if a requested bookmark is intended to be for an advertisement or for the regular content on demand, e.g., a movie.

To make such a determination according to an exemplary embodiment, the IPTV control server 106 can be informed about the existence of sessions which have been established between the network and a particular OITF 210 for the purpose of advertisement insertion. In order to obtain this information, according to this exemplary embodiment the IPTV control server 106 may subscribe (step 312) to the CC 304 to be notified of all sessions being established for advertisement insertion purposes and to receive all media control events for those sessions. The subscription 312 may be undertaken by the IPTV control server 106 once an OITF 210 starts a CoD session. Moreover, if the network does not establish RTSP sessions to stream the advertisements to the OITF 210, but instead uses other means, according to exemplary embodiments the subscription 312 then also enables the IPTV server 106 to be notified when an advertisement starts streaming and when that advertisement terminates.

In response to this subscription, the IPTV control server 106 will be notified of each ad session (of potentially a plurality of ad sessions) which is established in connection with a given CoD session. For example, as shown in FIG. 3, when a new RTSP session is established by the CDNC/CC 304 to stream an ad at step 316, the CDNC/CC 304 sends a notification signal 320 to the IPTV control server 106 which includes the RTSP identification for the ad session as well as the CoD session identification to which this advertisement corresponds. According to the exemplary embodiment of FIG. 3, the repository in which this information is stored is provided in the IPTV application node 308 and, accordingly, the IPTV control server 106 transmits the ad session information and the CoD session information to the IPTV application 308 via signal 322 for storage therein.

Then, when the CC 304 puts, for example, a streamed primary content on hold (signal 323), e.g., in response to a timer indicating that the primary content has played for a predetermined time period, to start playing an advertisement (through the separate RTSP session 316, and RTSP play signal 326), the CDNC/CC 304 also sends a NOTIFY signal 328 in accordance with the subscription 312 indicating that an advertisement associated with a particular RTSP session identification is being played. This information can be relayed to the IPTV application 308 via signal 330. The IPTV control server 106 maintains, in its local storage, the RTSPid of the content which is currently being played to enable it to later retrieve the content id for bookmarking as described below. Thus, the IPTV control server 106 and IPTV application 308 are both aware of the advertisement identifier associated with the advertisement which is playing on the end user's equipment and of all the session information established on the network side for the advertising purpose as illustrated by signals 320-330.

At a certain point in time, consider that the OITF 210 is outputting an advertisement 331 on an IPTV 202 when a user initiates a bookmark storing request process 332, 334 (as described in more detail below). Based on the information which has been gathered and stored as described above, the IPTV control server 106 is able to insert the appropriate information into the bookmark (e.g., including content identifier and position) before the bookmark is stored as shown by block 336. More specifically, and as one illustrative example, the IPTV control server 106 is aware, via the notifications described above, that the session having an RTSPid associated with one of the advertisements is currently playing at the time when the IPTV control server 106 receives the bookmark storing request signal 332 (or at the time when the bookmark storing request signal 332 is transmitted). Thus, as shown in more detail in FIG. 3(b), the IPTV server 106 can retrieve the content id from the network repository 350 associated with the RTSPid of the advertisement which is playing and initiate storage of that content id (and a position) in the bookmark by sending a signal toward user profile server 118. Acknowledgements 338, 340 are then sent back to the OITF 210 about the successful bookmarking process.

Figure 4A:
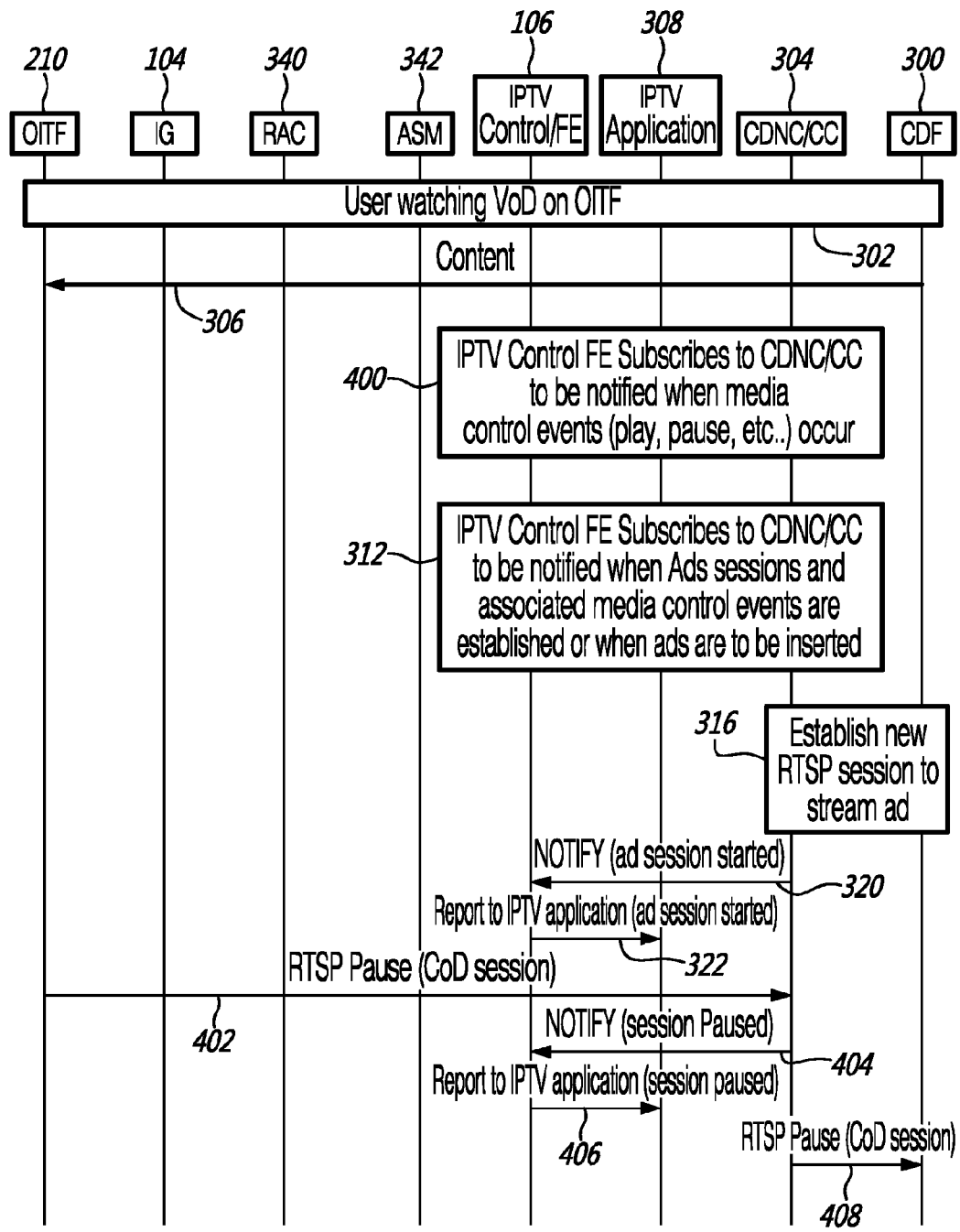

According to another exemplary embodiment, illustrated in FIGS. 4(a) and 4(b), the network can decide to insert an advertisement in response to a user-actuated (or OITF actuated) event, e.g., when the user pauses the primary content by pressing a pause button on his or her remote device 208. In FIGS. 4(a) and 4(b), the same reference numerals are re-used from FIG. 3 to represent the same or similar nodes and signals, and their description is omitted here for brevity.

In order to be able to make this decision to insert an advertisement according to this exemplary embodiment, the IPTV control server 106 needs to be informed when such media control events occur at the OITF 210. Thus, according to this exemplary embodiment, another subscription can be performed by the IPTV control server 106, as represented by block 400 in FIG. 4(a), whereby the IPTV control server 106 subscribes to the CDNC/CC 304 to be notified of media control events (play, pause, etc.) which occur at the OITF 210. Thus, when a media control event is signaled from the OITF 210 to the CDNC/CC 304, e.g., RTSP Pause (CoD Session) signal 402, this information is provided to the IPTV control server 106 via signal 404, including an identification of the RTSP session which has been paused. The IPTV control server 106 can forward this information to the IPTV application 308 via signal 406, e.g., to enable the network at the end of the session to collect information that includes when ad insertion was performed (event or time based), whether ads being watched or skipped, statistics, data analysis on collected data that can be provided to advertisers, etc.

In response to receipt of the RTSP Pause signal 402, the CDNC/CC 304 issues a pause command signal 408 toward the CDF 300 and the primary content is paused. As shown in FIG. 4(b), the IPTV control server 106 can issue a command 410 to the CDNC/CC 304 which instructs the CDNC/CC 304 to stream an advertisement when the user is ready to restart the primary content. This command can be acknowledged via signal 412. Thus, when the OITF 210 sends an RTSP PLAY signal 414 to the CDNC/CC 304, the CDNC/CC 304 will, in turn, instruct the CDF 300 to play an advertisement via signal 326, with the steps and signaling 326-336 then being the same or similar to those steps and signals which have the same reference numerals as described above with respect to FIG. 3. After the advertisement is finished playing, the primary content is resumed via steps and signals 414-422.

Although a primary feature of some exemplary embodiments involves the mechanisms described above by which the information needed to properly bookmark one of a primary content or advertisements associated with a user or OITF 210 is made available to an IPTV server 106, a somewhat more detailed discussion of an exemplary network-based bookmarking process is also provided here for completeness. Consider that the user decides to bookmark the content at its current position so that she or he can later finish watching and/or listening to that content. This can be indicated to the user's local system by, for example, providing a user input via the remote control device 208 indicating that he or she wants to bookmark the content.

In response to this, or some other type of input, the OITF 210 associated with the end user device 102, 202 transmits a bookmark storing request signal 332 through the network toward the IPTV control server 106. Although shown as a single arrow 334 in FIG. 3, it will be appreciated by those skilled in the art that the bookmark request storing signal can be implemented as a series of signals between the nodes indicated in the figure. For example, the OITF 210 can transmit an HTTP signal carrying a bookmark storing request message 332 to the IG 104, which can in turn forward the bookmark storing request message 332 to an Authentication Session Management (ASM) node 342 using SIP signalling. SIP is a transaction-oriented, text-based protocol for which more information can be found in the standards document referred to as "RFC 3261, SIP: Session Initiation Protocol", promulgated by the Network Working Group and downloadable at http://www.ietf.org/rfc/rfc3261.txt. The ASM 342 can, in turn, forward the bookmark storing request message 332 to the IPTV control server 106. The corresponding arrows associated with this series of signals are omitted to simplify the figure, and those skilled in the art will appreciate that other signaling mechanisms could be used to transmit the bookmark request storing signal 332 to the IPTV control server 106.

The bookmark storing request message 332 may include information which is available to the OITF 210 related to the content which is currently being watched on the end user device 102, 202 and which information may take the form of an XML schema. An example of an XML schema (which represents an exemplary, stored bookmark) is shown in FIG. 5. The bookmark storing request message 332 will typically include some of the information elements shown in the exemplary XML schema of FIG. 5, or may use a different format altogether. Thus, the information elements in the XML schema of FIG. 5 may either be filled in by the OITF 210 or by the network (the latter especially in the cases where the OITF does not have the capability to provide certain elements).

Of particular interest for the discussion of these exemplary embodiments are the information elements associated with content identifiers (content id) and position which are stored as part of a bookmark. In the example of FIG. 5, the "choice" elements (highlighted) are examples of content identifiers and the "Position" element is an example of a position identifier. The content id can, for example, be determined as described above with respect to FIG. 3. In addition, according to exemplary embodiments, it is generally the responsibility of the network to identify a location (position) where the bookmark is desired within the content to be retrieved later. The manner in which the position is determined may vary depending upon, for example, the type of content which is to be bookmarked, but can (as shown in block 336) involve using a start time of the content associated with the determined content id and a time at which the bookmark signal was transmitted (or received). Note that although the foregoing example of a bookmark storing request signal involves sending the bookmark request using HTTP and SIP to the IPTV control server (e.g., in an IMS implementation), that the bookmark request can be also sent from the OITF 210 using HTTP directly to the IPTV application.

The above-described embodiments relate to network-inserted advertisements. Alternatively, if the advertisements are inserted by the OITF 210 through establishment of a new RTSP session for the advertisements, then the OITF 210 itself can make the determination of the type of content (advertisement or regular CoD) and can include the correct identifier in the "AdIdentifier" element of the XML schema shown in FIG. 5. Furthermore, the OITF 210 can determine a position and include that information as well in the request to store the bookmark. In case the OITF 210 establishes other means than establishing a new RTSP session to acquire the advertisements and stream those locally to the end user, the OITF 210 is further able to include the correct information associated with such a local advertising insertion in its bookmark storing request signal.

Figure 6:
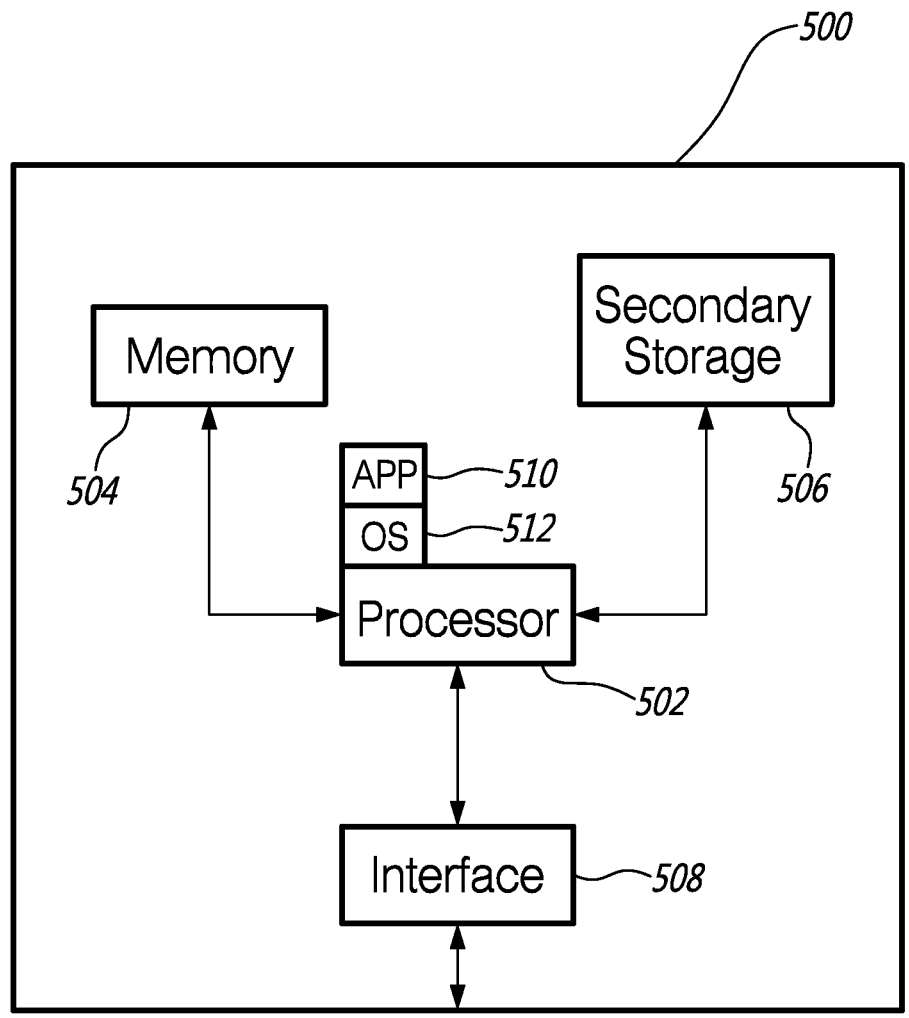
FIG. 6 is an IPTV server according to an exemplary embodiment.

The exemplary embodiments described above provide for messages and protocols involving IPTV servers and other network nodes. An exemplary IPTV control server 500 will now be described with respect to FIG. 6. IPTV control server 500 can contain a processor 502 (or multiple processor cores), memory 504, one or more secondary storage devices 506 and an interface unit 508 to facilitate communications between IPTV control server 500 and the rest of the network. The processor 502 can run, for example, an operating system 510 and an application 512, e.g., an IPTV Control/FE application, thereon and can be configured to perform the steps described in FIG. 7 below. If the network repository described above is residing with the IPTV control server 500, then such a repository can be implemented using the memory 504 and/or secondary storage 506. Alternatively, if the network repository is disposed in another node which is running an IPTV application, then the signaling described above toward and from such other node can occur via interface 508. Similar server structures can also be used for other network nodes described above, e.g., the IMS core network entities.

An exemplary method for network-based bookmarking of content which is currently being output at an end user device is illustrated in FIG. 7. Therein, at step 700, an IPTV server subscribes to receive notifications associated with the insertion of advertisements into other content that is being transmitted to an end user. The IPTV server receives, at step 702, at least one of these notifications. When the IPTV server receives a bookmark storing request signal (step 704), it determines (step 706) whether the content which is being transmitted to the end user at a time associated with the bookmark storing request signal is either one of the advertisements or the other content, e.g., a movie. Then, at step 708, the IPTV initiates storage of a bookmark including a content identifier having a value which is based upon its determination, e.g., by signaling the user profile server 118 to store the bookmark.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

It will be appreciated, in accordance with the foregoing exemplary embodiments, that the manner in which the position element of a bookmark is determined will vary, at least in part, based upon the type of media upon which the content being bookmarked is stored in the network. For example, if the scheduled content is stored on tape, then the bookmark is a position on the tape which means that a position which is calculated or determined as a function of time should be mapped into a corresponding tape position. Alternatively, if the scheduled content is stored in a digital file, then the bookmark position is a byte displacement from the beginning of the digital file such that a position which is calculated or determined as a function of time should be mapped into a digital location, e.g., byte position.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for network-based bookmarking of content which is currently being output at an end user device, the method comprising:
subscribing, by an IPTV server, to receive notifications associated with the start and an end of advertisements inserted into a primary content that is being transmitted to an end user;
receiving, by said IPTV server, upon the start of an advertisement, at least one of said notifications indicative of an ongoing advertisement session used for sending the advertisement to the end user device;

receiving, by said IPTV server, a bookmark storing request signal during said advertisement;

determining, by said IPTV server using information in said at least one of said notifications, that said content which is being transmitted to said end user at a time associated with said bookmark storing request signal is said advertisement; and initiating, by said IPTV server, storage of a bookmark including a content identifier that identifies the advertisement.

2. The method of claim 1, wherein said step of determining further comprises:

determining a session identification associated with said content at said time associated with said bookmark storing request signal; and retrieving, from a network repository, said content identifier using said session identification.

3. The method of claim 2, wherein said network repository is disposed at a node associated with an IPTV application.

4. The method of claim 1, wherein said notifications include notifications regarding when media control events occur.

5. The method of claim 1, wherein said notifications include notifications regarding when advertisement sessions are established.

6. The method of claim 1, wherein said notifications include notifications regarding when advertisements are inserted into said primary content.

7. The method of claim 1, wherein said notifications include notifications regarding when media control events occur, notifications regarding when advertisement sessions are established and notifications regarding when advertisements are being played.

8. A communication system comprising:

an IPTV control server including:

a processor configured to subscribe and receive notifications associated with the start and an end of advertisements inserted into a primary content that is being transmitted to an end user, the processor receiving upon the start of an advertisement at least one of said notifications indicative of an ongoing advertisement session used for sending the advertisement to the end user device, and further configured to receive a bookmark storing request signal during said advertisement;

wherein, in response to receiving said bookmark storing request signal, said processor is configured to determine, using information in said at least one of said notifications, that said content which is being transmitted to said end user at a time associated with said bookmark storing request signal is said advertisement; and further wherein said processor is configured to initiate storage of a bookmark including a content identifier that identifies the advertisement.

9. The communication system of claim 8, further comprising:

a network repository configured to store session information associated with said advertisements and said other content;

wherein said processor is further configured to determine a session identification associated with said content at said time associated with said bookmark storing request signal and to retrieve, from said network repository, said content identifier using said session identification.

10. The communication system of claim 9, wherein said network repository is disposed at a node associated with an IPTV application.

11. The communication system of claim 9, wherein said network repository is co-located with said IPTV control server.

12. The communication system of claim 8, wherein said notifications include notifications regarding when media control events occur.

13. The communication system of claim 8, wherein said notifications include notifications regarding when advertisement sessions are established.

14. The communication system of claim 8, wherein said notifications include notifications regarding when advertisements are inserted into said primary content.

15. The communication system of claim 8, wherein said notifications include notifications regarding when media control events occur, notifications regarding when advertisement sessions are established and notifications regarding when advertisements are being played.

16. A non-transitory computer-readable medium containing instructions which, when executed on a processor or computer, perform the steps of:

subscribing to receive notifications associated with the start of and an end of advertisements inserted into a primary content that is being transmitted to an end user;

upon the start of an advertisement, receiving at least one of said notifications indicative of an ongoing advertisement session used for sending the advertisement to the end user device;

receiving a bookmark storing request signal during said advertisement;

determining, using information in said at least one of said notifications, that said content which is being transmitted to said end user at a time associated with said bookmark storing request signal is said advertisement; and initiating storage of a bookmark including a content identifier that identifies the advertisement.

17. The computer-readable medium of claim 16, further containing instructions which, when executed on a processor or computer perform the steps of:

determining a session identification associated with said content at said time associated with said bookmark storing request signal; and retrieving, from a network repository, said content identifier using said session identification.

18. The computer-readable medium of claim 16, wherein said notifications include notifications regarding when media control events occur.

19. The computer-readable medium of claim 16, wherein said notifications include notifications regarding when advertisement sessions are established.

20. The computer-readable medium of claim 16, wherein said notifications include notifications regarding when advertisements are inserted into said primary content.

21. The computer-readable medium of claim 16, wherein said notifications include notifications regarding when media control events occur, notifications regarding when advertisement sessions are established and notifications regarding when advertisements are being played.

* * * * *